United States Patent
Ishihara et al.

(10) Patent No.: US 9,540,790 B2
(45) Date of Patent: Jan. 10, 2017

(54) WORK MACHINE

(71) Applicant: HITACHI CONSTRUCTION MACHINERY CO., LTD., Bunkyo-ku, Tokyo (JP)

(72) Inventors: Shinji Ishihara, Ibaraki (JP); Masatoshi Hoshino, Ibaraki (JP); Hiroshi Sakamoto, Ibaraki (JP); Hidetoshi Satake, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/916,607

(22) PCT Filed: Oct. 24, 2014

(86) PCT No.: PCT/JP2014/078380
§ 371 (c)(1),
(2) Date: Mar. 4, 2016

(87) PCT Pub. No.: WO2015/064507
PCT Pub. Date: May 7, 2015

(65) Prior Publication Data
US 2016/0215480 A1 Jul. 28, 2016

(30) Foreign Application Priority Data
Nov. 1, 2013 (JP) ................... 2013-228757

(51) Int. Cl.
*E02F 9/20* (2006.01)
*B60K 6/485* (2007.10)
(Continued)

(52) U.S. Cl.
CPC ............. *E02F 9/2075* (2013.01); *B60K 6/485* (2013.01); *B60L 11/1862* (2013.01);
(Continued)

(58) Field of Classification Search
CPC .......... E02F 9/2075; E02F 3/32; E02F 9/2296; E02F 9/2246; E02F 9/2235; B60L 11/1862; B60W 10/06; B60W 10/08; B60W 20/00; B60W 2710/0677; B60K 6/485; Y02T 10/6226; Y02T 10/6286
See application file for complete search history.

(56) References Cited

U.S. PATENT DOCUMENTS 7,891,182 B2 * 2/2011 Kelly .................... E02F 3/7636
60/426
2004/0098984 A1 * 5/2004 Duell .................... E02F 9/2235
60/431
(Continued)

FOREIGN PATENT DOCUMENTS

JP 200328071 A * 1/2003
JP 2004-150307 A 5/2004
(Continued)

OTHER PUBLICATIONS

International Search Report (PCT/ISA/210) issued in PCT Application No. PCT/JP2014/078380 dated Jan. 27, 2015 with English translation (Four (4) pages).
(Continued)

*Primary Examiner* — Darlene P Condra
(74) *Attorney, Agent, or Firm* — Crowell & Moring LLP

(57) ABSTRACT

To provide a work machine that can suppress a steep fluctuation in engine power. The present invention includes an engine 11; a hydraulic pump 12 that is driven by the engine 11; a hydraulic actuator 17 that is driven by pressure oil discharged from the hydraulic pump 12; a motor generator 13 that drives the hydraulic pump 12; an electrical storage device 14 that transfers electric power with the motor generator 13; a load computing unit 21 that computes the load power of the engine 11; a vehicle body state
(Continued)

management unit 22 that manages a vehicle body state including the state of the electrical storage device 14; an engine power fluctuation limitation unit 23 that computes second target power for limiting the increase rate and the decrease rate of the power of the engine 11 on the basis of the load power and the vehicle body state; a hydraulic power limitation unit 24 that limits the power of the hydraulic pump 12 on the basis of the second target power; and an assist power computation unit 25 that limits the power of the motor generator 13 on the basis of the second target power.

10 Claims, 12 Drawing Sheets

(51) Int. Cl.
    *B60W 10/06*     (2006.01)
    *B60W 10/08*     (2006.01)
    *B60W 20/00*     (2016.01)
    *E02F 9/22*     (2006.01)
    *B60L 11/18*     (2006.01)
    *E02F 3/32*     (2006.01)

(52) U.S. Cl.
    CPC ............ *B60W 10/06* (2013.01); *B60W 10/08* (2013.01); *B60W 20/00* (2013.01); *E02F 3/32* (2013.01); *E02F 9/2235* (2013.01); *E02F 9/2246* (2013.01); *E02F 9/2296* (2013.01); *B60W 2710/0677* (2013.01); *Y02T 10/6226* (2013.01); *Y02T 10/6286* (2013.01)

(56) References Cited

U.S. PATENT DOCUMENTS

| | | | |
|---|---|---|---|
| 2011/0251746 A1* | 10/2011 | Wu | B60K 6/48 701/22 |
| 2012/0035815 A1* | 2/2012 | Kawashima | B60K 6/48 701/50 |
| 2012/0109472 A1* | 5/2012 | Yanagisawa | B60K 6/46 701/50 |
| 2012/0158225 A1* | 6/2012 | Books | B60W 50/00 701/22 |
| 2013/0193892 A1 | 8/2013 | Ishihara et al. | |
| 2013/0325268 A1 | 12/2013 | Ishihara et al. | |
| 2014/0188320 A1* | 7/2014 | Moriki | E02F 9/2075 701/22 |

FOREIGN PATENT DOCUMENTS

| | | |
|---|---|---|
| JP | 4633813 B2 | 2/2011 |
| JP | 2012-180683 A | 9/2012 |
| WO | WO 2012/050135 A1 | 4/2012 |

OTHER PUBLICATIONS

Japanese-language Written Opinion (PCT/ISA/237) issued in PCT Application No. PCT/JP2014/078380 dated Jan. 27, 2015 (Four (4) pages).

\* cited by examiner

WORK MACHINE

TECHNICAL FIELD

The present invention relates to a work machine such as, for example, a hydraulic excavator, and particularly to a work machine that can drive a hydraulic pump using an engine and a motor generator.

BACKGROUND ART

Recently, in a work machine such as a hydraulic excavator of this kind, so-called hybrid-type construction machine using not only an engine but also a motor generator as a power source has been proposed for the purpose of energy saving (high fuel efficiency) or for the purpose of reducing the amount of exhaust gas (for example, carbon dioxide, nitrogen oxide, particulate substances, and the like) that is discharged from an engine and that has an impact on environments. When pump absorption power exceeds the output upper limit of the engine, the hybrid-type construction machinery provided with the motor generator of this kind sets the power increase speed of the engine at a predetermined value or smaller by correcting a difference between the pump absorption power and the output upper limit of the engine using the power of the motor generator.

As a conventional technique related to the hybrid-type construction machinery of this kind, disclosed is Patent Literature 1 in order to prevent exhaust gas having an impact on environments, in particular, black exhaust from being generated by avoiding a decrease in engine combustion efficiency. In Patent Literature 1, the output upper limit of the engine at which the power increase speed of the engine corresponds to a predetermined increase rate or smaller is calculated. When pump absorption power exceeds the output upper limit of the engine, a hydraulic pump or a motor generator is controlled so that the power increase speed of the engine corresponds to a predetermined value or smaller by suppressing the upper limit of the pump absorption power to the output upper limit of the engine. Accordingly, the power of the engine is prevented from being steeply increased.

CITATION LIST

Patent Literature

Patent Literature 1: Japanese Patent No. 4633813

SUMMARY OF INVENTION

Technical Problem

An object of the above-described Patent Literature 1 is to suppress exhaust gas by limiting the increase speed so that the power of the engine is not steeply increased in accordance with the output upper limit of the engine that is increased at a predetermined increase rate. However, in the case of the conventional technique disclosed in Patent Literature 1, the state of an electrical storage device that supplies electric power to the motor generator is not monitored. In addition, the hydraulic pump is not controlled. Therefore, when the remaining electricity storage amount of the electrical storage device is insufficient and the electric power cannot be sufficiently supplied to the motor generator, a decrease in engine combustion efficiency cannot be avoided. In addition, the engine power is steeply fluctuated due to a steep increase in the pump absorption power, and thus the engine is possibly stalled.

The present invention has been made on the basis of the actual condition in the above-described conventional technique, and an object thereof is to provide a work machine that can suppress a steep fluctuation in engine power.

Solution to Problem

In order to achieve the object, the present invention comprises: an engine; a hydraulic pump that is driven by the engine; a hydraulic operation unit that is driven by pressure oil discharged from the hydraulic pump; a motor generator that drives the hydraulic pump; an electrical storage device that transfers electric power with the motor generator; a load computing unit that computes the load power of the engine; a vehicle body state management unit that manages a vehicle body state including the state of the electrical storage device; an engine target power computing unit that computes engine target power for limiting an increase and a decrease in the power of the engine on the basis of the load power computed by the load computing unit and the vehicle body state managed by the vehicle body state management unit; a hydraulic power limitation unit that limits the power of the hydraulic pump on the basis of the engine target power computed by the engine target power computing unit; and an assist power limitation unit that limits the power of the motor generator on the basis of the engine target power computed by the engine target power computing unit.

Advantageous Effects of Invention

The present invention is configured in such a manner that the engine target power for limiting an increase and a decrease in engine power is computed by the engine target power computing unit on the basis of the load power of the engine computed by the load computing unit and the vehicle body state managed by the vehicle body state management unit, and the power of the hydraulic pump is limited by the hydraulic power limitation unit on the basis of the engine target power. In addition, the power of the motor generator is limited by the assist power limitation unit. In the configuration of the present invention, the power of the hydraulic pump is limited on the basis of the engine target power for limiting an increase and a decrease in engine power, and the power of the motor generator is limited. Accordingly, a steep fluctuation in engine power can be suppressed. The other objects, configurations, and effects will become apparent from the following description of embodiments.

DESCRIPTION OF EMBODIMENTS

Hereinafter, embodiments of the present invention will be described on the basis of the drawings.

First Embodiment

Figure 1:
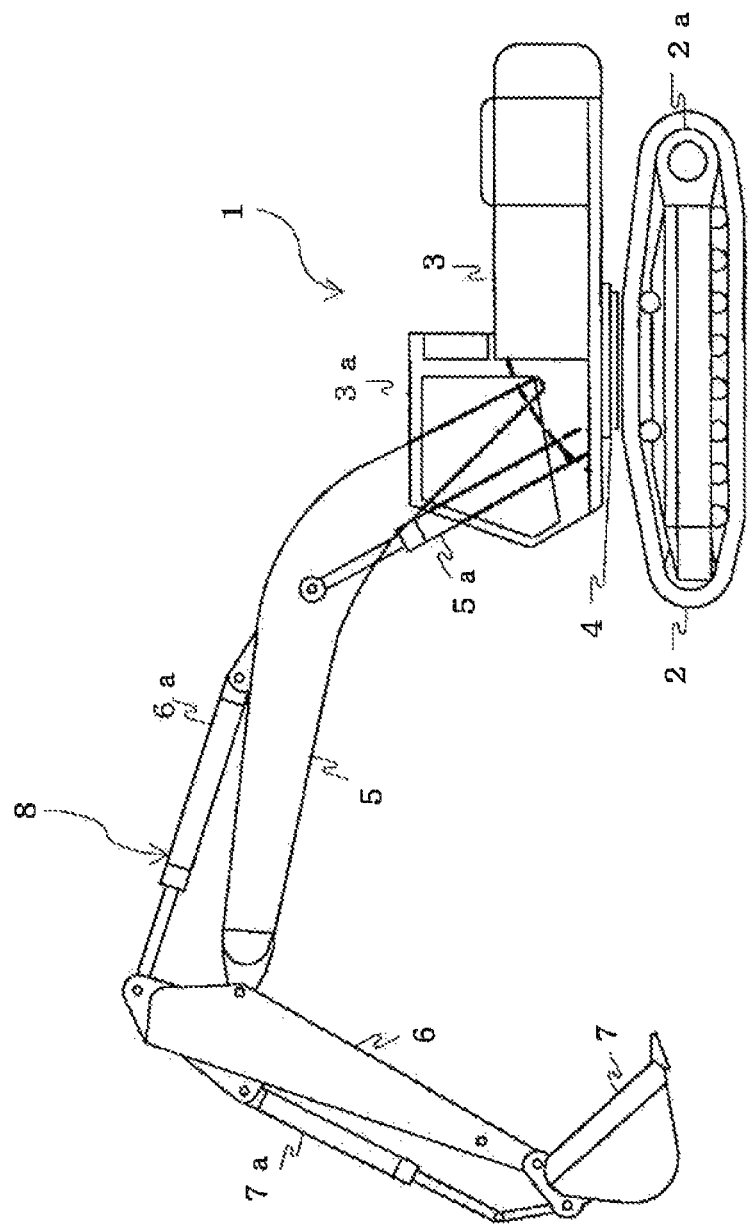
FIG. 1 is a side view of a hydraulic excavator according to a first embodiment of the present invention.
Figure 2:
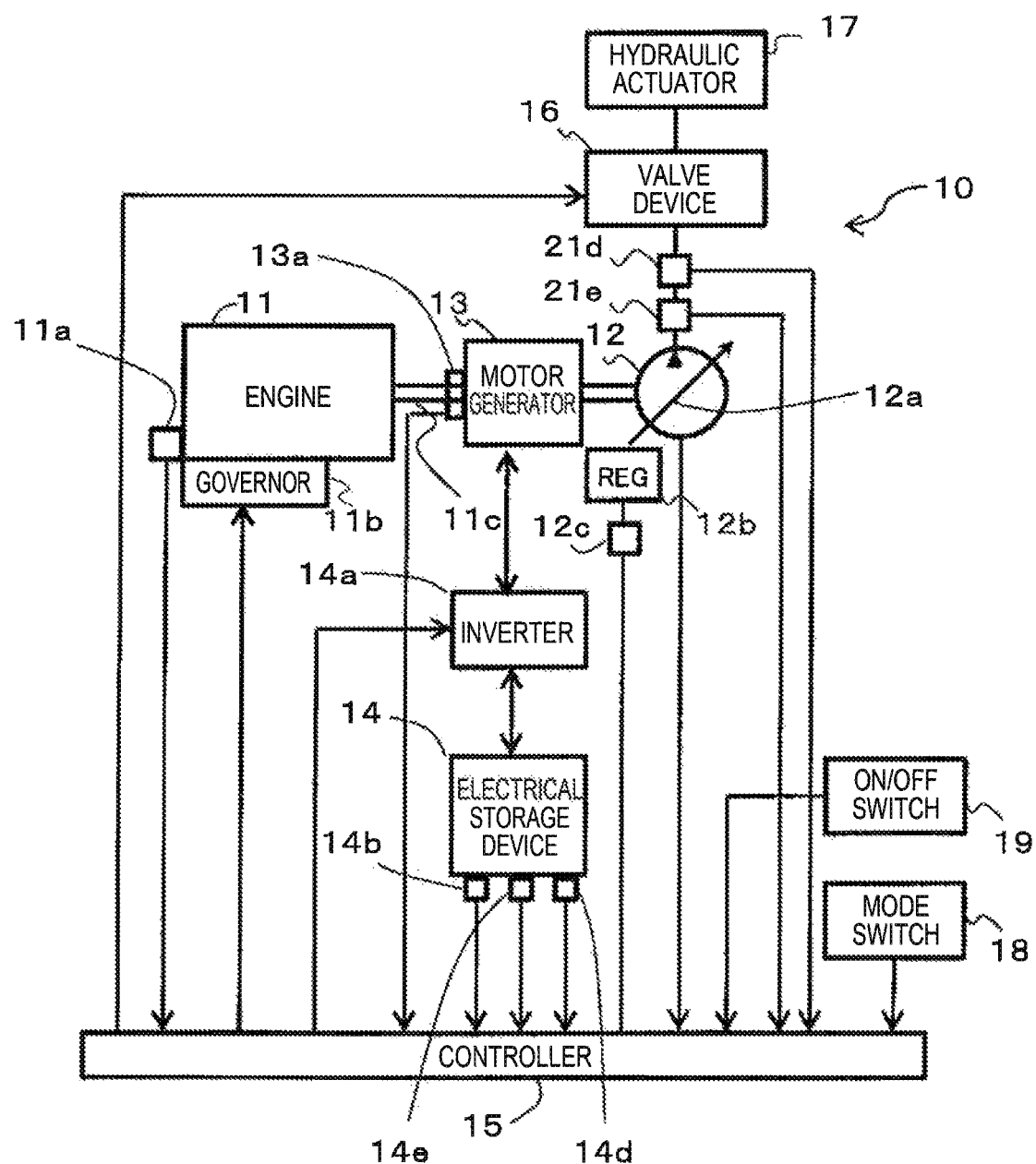
FIG. 2 is a configuration diagram for showing a hydraulic driving device mounted in the above-described hydraulic excavator.
Figure 3:
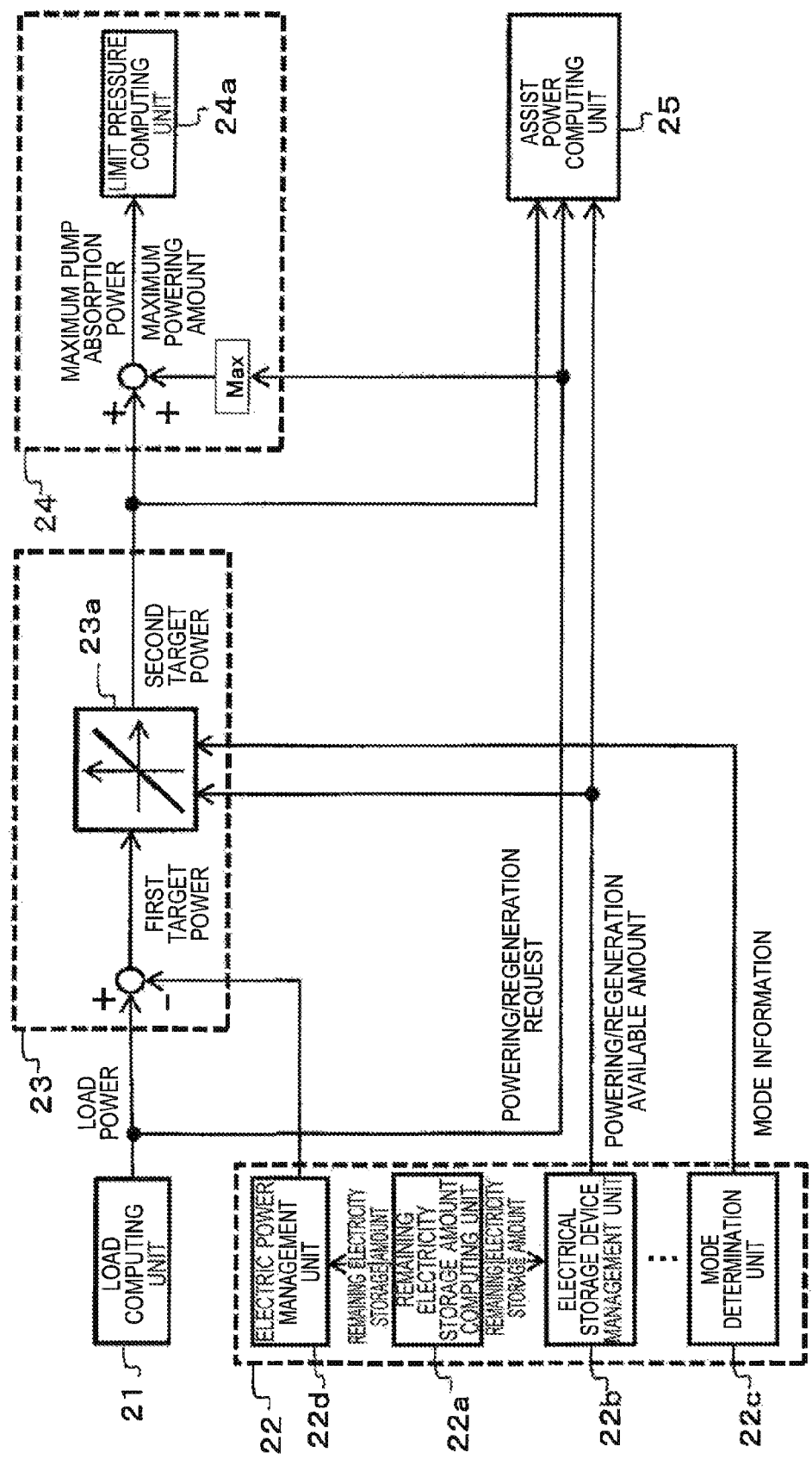
FIG. 3 is a schematic view for showing a configuration of a controller of the above-described hydraulic driving device.
Figure 4:
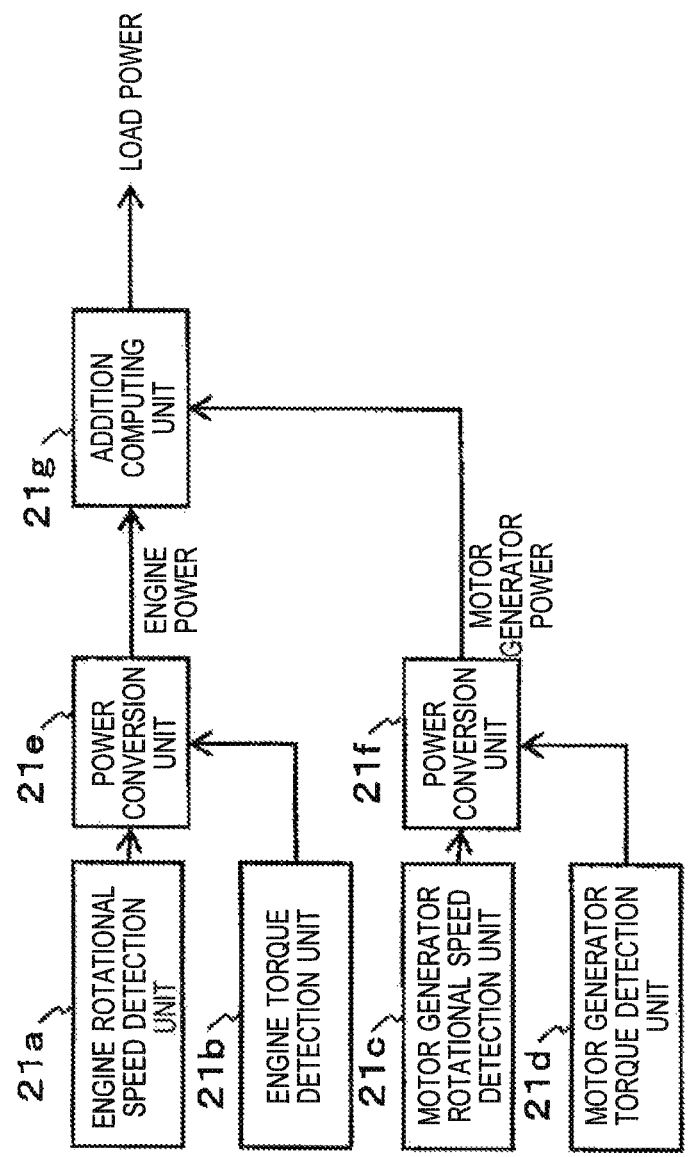
FIG. 4 is a schematic view for showing a process in a load computing unit of the above-described controller.

FIG. 1 is a side view of a hydraulic excavator 1 according to a first embodiment of the present invention. FIG. 2 is a configuration diagram for showing a hydraulic driving device mounted in the hydraulic excavator. FIG. 3 is a schematic view for showing a configuration of a controller of the hydraulic driving device. FIG. 4 is a schematic view for showing a process of a load computing unit of the controller.
<Configuration>

A hydraulic excavator 1 that is a first embodiment of a work machine according to the present invention is a so-called hybrid-type excavator, and includes, as shown in FIG. 1, a lower travel base 2 having a crawler-type travel device 2a, and a revolving upperstructure 3 that is attached on the lower travel base 2 in a revolvable manner. The lower travel base 2 and the revolving upperstructure 3 are attached to each other through a revolving device 4 in a revolvable manner.

On the front side of the revolving upperstructure 3, provided is a cab 3a on which an operator rides to operate the hydraulic excavator 1, and a base end of a boom 5 is rotatably attached on the front side of the cab 3a. The boom 5 is operated through a boom cylinder 5a that is driven by hydraulic oil (pressure oil) to be supplied as a fluid. A base end of an arm 6 is rotatably attached to a tip end of the boom 5. The arm 6 is operated through an arm cylinder 6a. A base end of a bucket 7 is rotatably attached to a tip end of the arm 6. The bucket 7 is operated through a bucket cylinder 7a. A front working device 8 as an operating part to conduct, for example, excavation work is configured using the boom 5, the boom cylinder 5a, the arm 6, the arm cylinder 6a, the bucket 7, and the bucket cylinder 7a.

A hydraulic driving device 10 that drives the hydraulic excavator 1 is mounted in the revolving upperstructure 3. The hydraulic driving device 10 is a hydraulic driving control device used to drive the front working device 8, the revolving device 4, the travel device 2a, and the like. As shown in FIG. 2, the hydraulic driving device 10 includes an engine 11 as a power source. Here, the engine 11, a hydraulic system, and various electric components are controlled in some way by a controller 15 to be described later, but are not illustrated in FIG. 2 due to no direct relation with the present invention.

To the engine 11, attached are a turbocharger (not shown), a rotational speed sensor 11a that detects an engine rotational speed as a sensing device, and a governor 11b that adjusts the fuel injection amount of the engine 11. A variable displacement hydraulic pump 12 driven by the engine 11 is attached on a driving shaft 11c of the engine 11. A motor generator 13 that is mechanically connected on the driving shaft 11c of the engine 11 to assist the power of the engine 11 is attached between the hydraulic pump 12 and the engine 11. The hydraulic pump 12 is driven by the engine 11 and the motor generator 13. To the motor generator 13, attached is a rotation angle sensor 13a such as a resolver, as a sensing device. The rotation angle sensor 13a measures the rotation angle of the motor generator 13, and sensor information relevant to the measured rotation angle is output to the controller 15.

The motor generator 13 can transmit torque to the engine 11, and is electrically connected to an electrical storage device 14 through an inverter 14a as a motor generator control unit. The motor generator 13 is driven by power supplied from the electrical storage device 14, and the electric power generated by the motor generator 13 is supplied and charged to the electrical storage device 14. The electrical storage device 14 is a secondary battery such as a chargeable or dischargeable battery or capacitor. To the electrical storage device 14, attached are, as a sensing device that is a measurement unit for measuring the state of the electrical storage device 14, a current sensor 14b that detects the current of electric power output from the electrical storage device 14, a voltage sensor 14c that detects the voltage of electric power output from the electrical storage device 14, and a temperature sensor 14d that detects the temperature of the electrical storage device 14. The inverter 14a controls the electrical storage device 14 and the motor generator 13, and allows the electrical storage device 14 and the motor generator 13 to transfer electric power therebetween as needed.

To the inverter 14a, connected is the controller 15 as a control unit to control the torque of the motor generator 13 by controlling the inverter 14a. The controller 15 adjusts the fuel injection amount for the engine 11 by controlling the governor 11b, and controls the engine rotational speed.

To the hydraulic pump 12, attached is a valve device 16 to which hydraulic oil discharged from the hydraulic pump 12 is supplied. To the valve device 16, attached is a hydraulic actuator 17 that is a hydraulic operation unit. The hydraulic actuator 17 is driven by hydraulic oil discharged from the hydraulic pump 12, and the driving of the hydraulic actuator 17 is controlled under the control by the valve device 16. There are various hydraulic actuators corresponding to the hydraulic actuators 17, such as the boom cylinder 5a, the arm cylinder 6a, the bucket cylinder 7a, the travel device 2a, and the revolving device 4 shown in FIG. 1.

The hydraulic pump 12 includes a swash plate 12a for adjusting a pump volume, and a regulator 12b that controls the tilting angle of the swash plate 12a and an electromagnetic proportional valve 12c that drives the regulator 12b are attached to the hydraulic pump 12. The controller 15 computes a driving signal to the electromagnetic proportional valve 12c for the set arbitrary absorption power of the hydraulic pump 12, and the absorption power is adjusted in such a manner that the pump volume of the hydraulic pump 12 is operated by controlling the tilting angle of the swash plate 12a through the regulator 12b under the control pressure in accordance with the driving signal.

A discharge pressure sensor 12d that measures the hydraulic oil pressure (discharge pressure) discharged from the hydraulic pump 12 and a flow rate sensor 12e as a flowmeter that measures the flow rate (discharge flow rate) of the hydraulic oil that passes are connected between the hydraulic pump 12 and the valve device 16. To the hydraulic pump 12, attached is a tilting angle sensor (not shown) for measuring the tilting angle of the swash plate 12a. Sensor information such as the discharge pressure, the flow rate, and the tilting angle detected by the discharge pressure sensor 12d, the flow rate sensor 12e, and the tilting angle sensor is output to the controller 15.

To the controller 15, attached is a mode switch 18 that switches plural modes such as a power mode as a first mode in which the front working device 8 and the like of the hydraulic excavator 1 are powerfully operated and an eco-mode as a second mode in which improvement in a fuel consumption rate is given priority over the excavation power of the front working device 8. The mode switch 18 is attached to a position where the operator in the cab 3a can operate.

The controller 15 includes, as shown in FIG. 3, a load computing unit 21 that computes load power on the driving shaft 11a of the engine 11, a vehicle body state management unit 22 that manages a vehicle state including a state of the electrical storage device 14, and an engine power fluctuation limitation unit 23 that generates engine target power (second target power) that limits the change rate (the increase rate and the decrease rate) of the engine power. The controller 15 includes a hydraulic power limitation unit 24 that computes the limit value of the absorption power of the hydraulic pump 12 in accordance with the computation results of the load computing unit 21 and the vehicle body state management unit 22, and an assist power computing unit 25 that computes the power command value of the motor generator 13.

To the controller 15, attached is an on/off switch 19 that turns on or off leveling control to level the engine power by changing the change rate of the engine target power in accordance with a vehicle body condition. The leveling control is conducted in the load computing unit 21, the vehicle body state management unit 22, the engine power fluctuation limitation unit 23, the hydraulic power limitation unit 24, and the assist power computing unit 25. Further, the on/off switch 19 is attached to a position where the operator in the cab 3a can operate.

The load computing unit 21 computes load power including the shaft power of the driving shaft 11c of the engine 11. Specifically, the load computing unit 21 considers the transfer of energy mainly from an inertial body such as a flywheel due to acceleration or deceleration of the engine 11 while including the load of an auxiliary machine such as an air conditioner, and calculates the load power on the basis of the sum of the power of the engine 11 and the power of the motor generator 13.

The load computing unit 21 has, as shown in FIG. 4, an engine rotational speed detection unit 21a, an engine torque detection unit 21b, a motor generator rotational speed detection unit 21c, and a motor generator torque detection unit 21d. The engine rotational speed detection unit 21a detects the engine rotational speed through the rotational speed sensor 11a. The engine torque detection unit 21b may directly measure the engine torque by attaching a torque meter (not shown) to the engine 11, or may indirectly compute the engine torque on the basis of the fuel injection amount and the like detected trough the governor 11b. The motor generator rotational speed detection unit 21c detects the motor generator rotational speed on the basis of the rotation angle of the motor generator 13 detected by the rotation angle sensor 13a. The motor generator torque detection unit 21d may directly measure the motor generator torque by attaching a torque meter (not shown) to the motor generator 13, or may indirectly compute the motor generator torque on the basis of the current value of the motor generator 13 or the inverter 14a.

The load computing unit 21 outputs the engine rotational speed detected by the engine rotational speed detection unit 21a and the engine torque detected by the engine torque detection unit 21b to an engine power conversion unit 21e, and the engine power is calculated on the basis of the product of the engine rotational speed and the engine torque by the engine power conversion unit 21e. Further, the motor generator rotational speed detected by the motor generator rotational speed detection unit 21c and the motor generator torque detected by the motor generator torque detection unit 21d are output to a motor generator power conversion unit 21f, and the motor generator power that is assist power is calculated on the basis of the product of the motor generator rotational speed and the motor generator torque by the motor generator power conversion unit 21f.

The engine power conversion unit 21e and the motor generator power conversion unit 21f convert the product of the rotational speed and the torque to power, but conversion in which the load on the driving shaft 11c of the engine 11 is calculated is included in consideration of various efficiencies. Further, the engine power calculated by the engine power conversion unit 21e and the motor generator power calculated by the motor generator power conversion unit 21f are output to an addition computing unit 21g, and the load power is estimated by adding the engine power to the motor generator power in the power addition computing unit 21g.

The vehicle body state management unit 22 monitors and manages the state of the entire vehicle body including the state of the electrical storage device 14 of the hydraulic excavator 1. The vehicle body state management unit 22 mainly includes, as shown in FIG. 3, an electric power management unit 22a and an electrical storage device management unit 22b that manage the state of the electrical storage device 14, a mode determination unit 22c that determines the operation mode of the vehicle body on the basis of on/off and the like of the mode switch 18, and a remaining electricity storage amount computing unit 22d that computes a remaining electricity storage amount on the basis of the state of charge (SOC) of the electrical storage device 14 at each of predetermined times. The vehicle body state management unit 22 is operated to manage a vehicle body state even when the control is switched on the basis of temperature information such as the temperature of the hydraulic oil discharged from the hydraulic pump 12 and the temperature of outside air.

The electric power management unit 22a computes a powering request (powering power) or a regeneration request (regeneration power) for the motor generator 13 to keep the output electric power of the electrical storage device 14 in an appropriate range that is a predetermined state. The electric power management unit 22a computes the powering request or the regeneration request so that the remaining electricity storage amount computed by the remaining electricity storage amount computing unit 22d is allowed to follow and match a predetermined target remaining electricity storage amount that is separately computed in the electric powet management unit 22a. Of the powering request and the regeneration request, for example, when the remaining electricity storage amount is higher than the target remaining electricity storage amount, the powering request is used. When the remaining electricity storage amount is lower than the target remaining electricity storage amount, the regeneration request is used.

The electrical storage device management unit 22b computes a powering available amount for powering the hydraulic pump 12 in the electrical storage device 14 through the motor generator 13, or computes a regeneration available amount regenerated to the electrical storage device 14 from the hydraulic pump 12 through the motor generator 13. In addition to the remaining electricity storage amount computed at each time by the remaining electricity storage amount computing unit 22d, the electrical storage device management unit 22b calculates the powering available amount or the regeneration available amount in a predetermined output range in which the electrical storage device 14 can be used in an appropriate state.

For example, when a charging operation or a discharging operation for the electrical storage device 14 continues for a considerably long period of time and the temperature of the electrical storage device 14 becomes high, the electrical storage device management unit 22b limits the amount of output currents of the electrical storage device 14 by limiting the transfer of electric power to the motor generator 13 to prevent the electrical storage device 14 from exceeding the temperature. Accordingly, the amount of heat generation of the electrical storage device 14 is controlled to be lowered. Even when the remaining electricity storage amount of the electrical storage device 14 is sufficient, the electrical storage device management unit 22b limits the range of use of the electrical storage device 14 in consideration of maintenance of other devices.

In the case where the electrical storage device 14 is a lithium-ion battery, the electrical storage device management unit 22b calculates the powering available amount to be low because the electrical storage device 14 has a characteristic in which the output voltage is dropped when the temperature is extremely low, namely, at extremely low temperature even if the electrical storage device 14 is fully charged (full charge). The electrical storage device management unit 22b calculates the powering available amount on the basis of information other than the remaining electricity storage amount of the electrical storage device 14, and limits excessive absorption power in the hydraulic pump 12 by appropriately managing the power to be supplied from the engine 11 and the motor generator 13 to prevent the engine 11 from stalling.

The electrical storage device management unit 22b calculates the powering available amount or the regeneration available amount on the basis of factors such as temperatures and the amount of currents that affect the usable lifetime of the electrical storage device 14, and prevents the electrical storage device 14 from excessively deteriorating. When the remaining electricity storage amount of the electrical storage device 14 is zero (0), the electrical storage device management unit 22b computes the powering available amount as zero (0). When the remaining electricity storage amount of the electrical storage device 14 is a maximum value (in the case of full charge), the electrical storage device management unit 22b computes the regeneration available amount as zero (0).

The remaining electricity storage amount computing unit 22d computes the remaining electricity storage amount of the electrical storage device 14 on the basis of the current value, the voltage value, and the temperature detected by the current sensor 14b, the voltage sensor 14c, and the temperature sensor 14d attached to the electrical storage device 14, and computes the remaining electricity storage amount of the electrical storage device 14 at each of preliminarily-set times.

The engine power fluctuation limitation unit 23 is an engine target power computing unit that computes the engine target power, and calculates first target power by adding the powering request or the regeneration request computed by the electric power management unit 22a to the load power computed by the load computing unit 21. The first target power is computed as "engine power"="load power"−"motor generator power", and thus the steep fluctuation of the load power is directly reflected on the first target power. Accordingly, the first target power is input to a variable rate limiter 23a to be fattened, and is converted to second target electric power that is the engine target power with the change rate limited. The second target electric power becomes a signal passing through the variable rate limiter 23a, and the steep fluctuation such as the first target electric power is suppressed to be calculated as a flattened target value.

The variable rate limiter 23a can sequentially change an increase rate (increase) and a decrease rate (decrease) when the second target power is generated from the first target power, and corrects the increase rate or the decrease rate small as the absolute value of the powering available amount or the regeneration available amount computed by the electrical storage device management unit 22b is larger. The variable rate limiter 23a may change the change rate of the second target power to the first target power in accordance with the powering available amount or the regeneration available amount output from the vehicle body state management unit 22.

Figure 5:
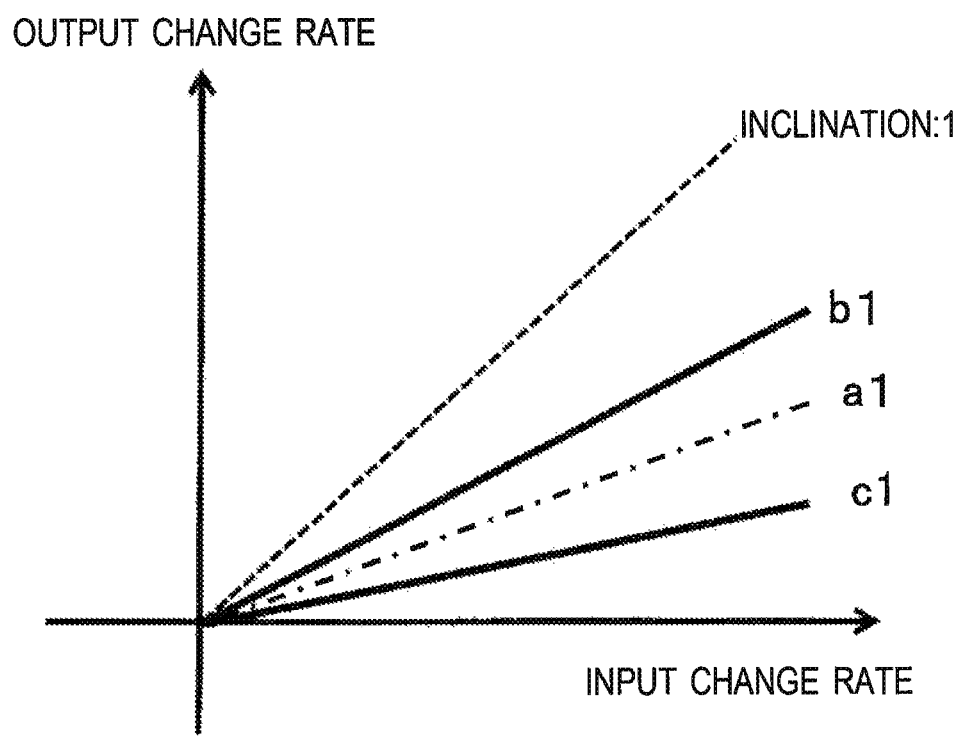
FIG. 5 is a graph for showing a change in a variable rate limiter due to mode selection by a mode determination unit of the above-described controller.

Here, an influence of the mode determination unit 22c of the vehicle body state management unit 22 on the variable rate limiter 23a will be described with reference to FIG. 5. FIG. 5 is a graph for showing a change in the variable rate limiter 23a due to the mode selection in the mode determination unit 22c of the controller 15.

When the mode switch 18 shown in FIG. 2 is set at the "power mode", improvement in the fuel consumption rate (fuel efficiency) and the suppression of exhaust gas are less effective. However, in order to secure supply power to the hydraulic pump 12 by largely changing the power of the engine 11, the change rate (the output change rate relative to the input change rate) that is the increase rate or the decrease rate of the second target power to the first target power in the variable rate limiter 23a is set at a power mode value b1 higher than a reference value a1 as shown in FIG. 5.

On the other hand, when the mode switch 18 is set at the "eco-mode", the change rate in the variable rate limiter 23a is set at an eco-mode value c1 lower than the reference value a1. When the change rate in the variable rate limiter 23a is negative, namely, the decrease rate is a requirement to lower the supply power of the hydraulic pump 12, and does not affect the operability of the hydraulic actuator 17. Thus, the decrease rate may be set independently on switching between the "power mode" and the "eco-mode" in the mode switch 18.

Figure 6:
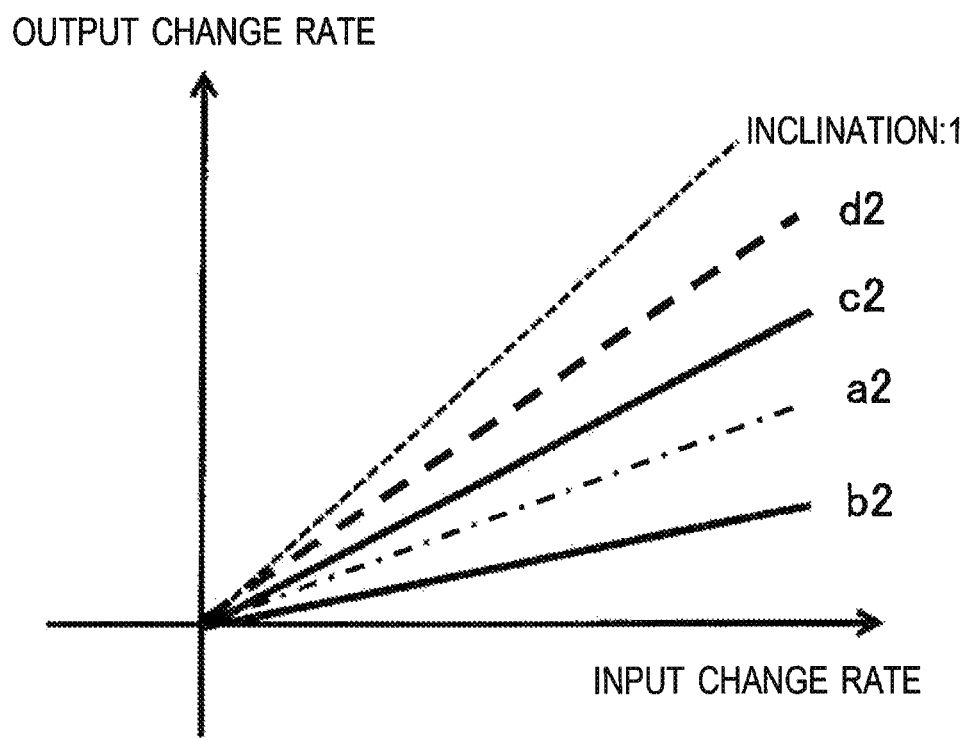
FIG. 6 is a graph for showing a change in the increase rate of the variable rate limiter using a powering available amount computed by an electrical storage device management unit of the above-described controller.
Figure 7:
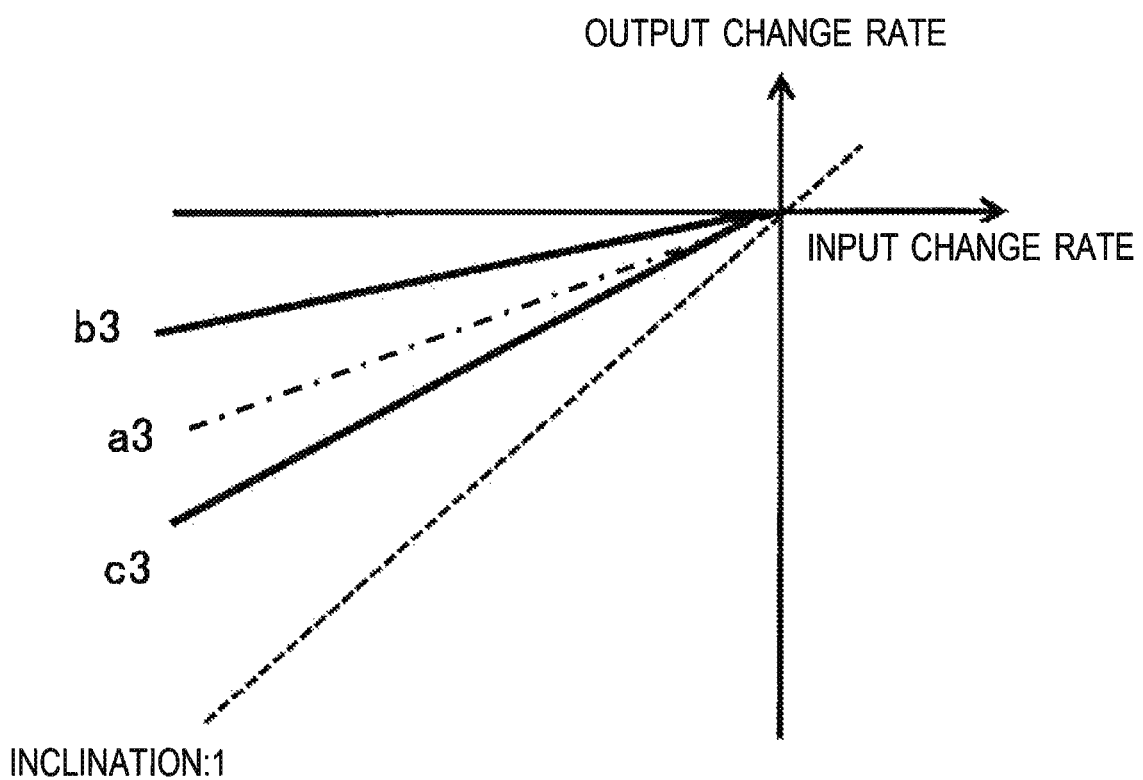
FIG. 7 is a graph for showing a change in the decrease rate of the variable rate limiter using a regeneration available amount computed by the electrical storage device management unit of the above-described controller.

Next, an influence of the electrical storage device management unit 22b of the vehicle body state management unit 22 on the variable rate limiter 23a will be described with reference to FIG. 6 and FIG. 7. FIG. 6 is a graph for showing a change in the increase rate of the variable rate limiter 23a due to the powering available amount computed by the electrical storage device management unit 22b of the controller 15. FIG. 7 is a graph for showing a change in the decrease rate of the variable rate limiter 23a due to the regeneration available amount computed by the electrical storage device management unit 22b of the controller 15.

(Increase Rate)

As shown in FIG. 6, a reference value for the change rate (increase rate) in the variable rate limiter 23a determined by the mode determination unit 22c and the like is assumed as a reference value a2. In this state, when the powering available amount computed by the electrical storage device management unit 2b becomes high, the assist amount of the engine 11 by the motor generator 13 can be increased. Even when the load power computed by the load computing unit 21 is steeply increased, the power of the engine 11 can be slowly increased. Thus, the increase rate in the variable rate limiter 23a is changed to a high powering value b2 lower than the reference value a2.

On the other hand, when the powering available amount computed by the electrical storage device management unit 22b becomes low, the assist amount of the engine 11 by the motor generator 13 is decreased. When the load power is steeply increased, the power of the engine 11 cannot be slowly increased. Thus, there is a possibility that the engine 11 stalls. Accordingly, the increase rate in the variable rate limiter 23a is changed to a low powering value c2 higher than the reference value a2 so as to actively use the power of the engine 11.

When the powering available amount is computed as zero (0) by the electrical storage device management unit 22b, the engine 11 cannot be assisted by the motor generator 13, and the engine power is output in accordance with the first target power. Thus, the increase rate in the variable rate limiter 23a is set at the value of inclination "1" shown in FIG. 6. In this case, the increase rate in the variable rate limiter 23a is set at a value d2 lower than the inclination 1 shown in FIG. 6, and no excessive load power is applied to the engine 11 using the hydraulic power limitation unit 24. Accordingly, the generation of exhaust gas can be suppressed although there is a possibility that the operation of the hydraulic excavator 1 becomes slightly slow.

(Decrease Rate)

As shown in FIG. 7, a reference value for the change rate (decrease rate) in the variable rate limiter 23a determined by the mode determination unit 22c and the like is assumed as a reference value a3. In this state, when the regeneration available amount computed by the electrical storage device management unit 22b becomes high, electricity is generated by driving the motor generator 13 using the power of the hydraulic pump 12, and a load can be applied to the engine 11. Even when the load power computed by the load computing unit 21 is steeply deceased, the power of the engine 11 can be slowly decreased. Thus, the decrease rate in the variable rate limiter 23a is changed to a high regeneration value b3 lower than the reference value a3.

On the other hand, when the regeneration available amount computed by the electrical storage device management unit 22b becomes low, the amount of electricity generation by the motor generator 13 becomes small, and a load cannot be applied to the engine 11. Thus, the decrease rate in the variable rate limiter 23a is changed to a low regeneration value c3 higher than the reference value a3. In this case, when the regeneration available amount is computed as zero (0) by the electrical storage device management unit 22b, no electricity is generated by the motor generator 13, and the power applied to the engine 11 matches the value of the load power computed by the load computing unit 21. Thus, the decrease rate in the variable rate limiter 23a is set at the value of inclination "1" shown in FIG. 7.

The hydraulic power limitation unit 24 limits the absorption power of the hydraulic pump 12. As shown in FIG. 2, the hydraulic power limitation unit 24 calculates as the maximum pump absorption power the value obtained by adding the maximum value (maximum powering amount) of the powering available amount computed by the electrical storage device management unit 22b to the second target power computed by the engine power fluctuation limitation unit 23, and the calculated maximum pump absorption power is input to a limit pressure computing unit 24a. Accordingly, a limit pressure limiting the absorption power of the hydraulic pump 12 is computed by the limit pressure computing unit 24a.

Even in a state where the motor generator 13 maximally assists the engine 11, the hydraulic power limitation unit 24 limits the absorption power of the hydraulic pump 12 so that the engine power output from the engine 11 does not exceed the second target power. In the hydraulic power limitation unit 24, when the powering available amount computed by the electrical storage device management unit 22b is zero (0), the pump absorption power matches the value of the second target power. Even when the motor generator 13 cannot assist the engine 11, an excessive load on the engine 11 can be prevented.

Figure 8A:
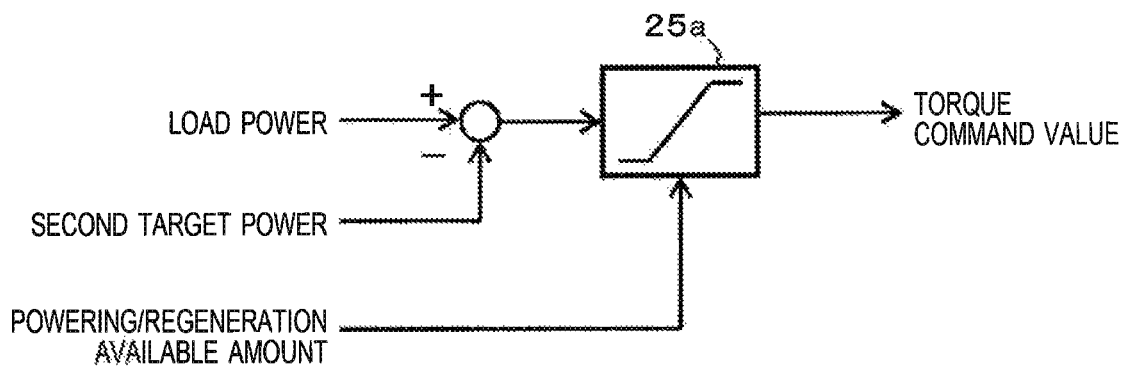
FIG. 8 are diagrams for showing computation by an assist power computing unit of the above-described controller, (a) shows a case in which a motor generator is driven by torque control, and (b) shows a case in which the motor generator is driven by speed control.

The assist power computing unit 25 is an assist power limitation unit that limits the power of the motor generator 13 to allow the actual engine power of the engine 11, namely, the actual power to follow the second target power. Here, FIG. 8 are diagrams for showing computation by the assist power computing unit 25 of the controller 15. FIG. 8(a) shows a case in which the motor generator 13 is driven by torque control, and FIG. 8(b) shows a case in which the motor generator 13 is driven by speed control.

As shown in FIG. 8(a), when the motor generator 13 is driven by torque control, the assist power computing unit 25 inputs into a limiter 25a a difference (load power-second target electric power) between the load power computed by the load computing unit 21 and the second target power computed by the engine power fluctuation limitation unit 23, and computes a preliminarily-set torque command value on the basis of the difference. The torque command value is output to the inverter 14a shown in FIG. 2, and the torque control is performed for the motor generator 13 through the inverter 14a.

Figure 8B:
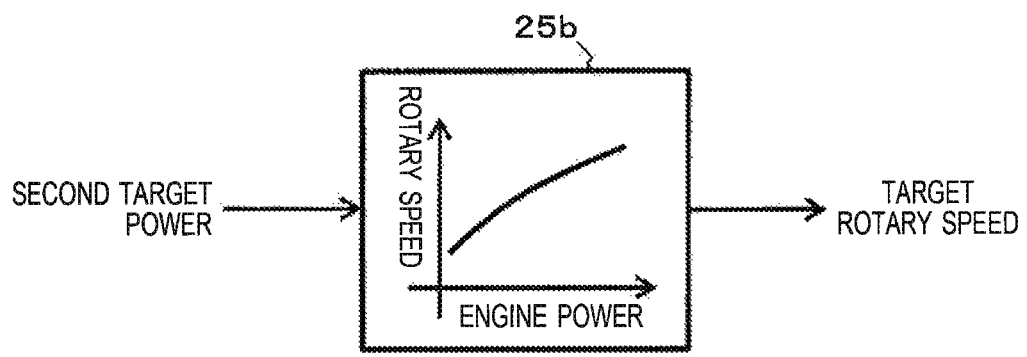

Further, as shown in FIG. 8(b), when the motor generator 13 is driven by speed control, the assist power computing unit 25 computes an engine rotary speed relative to the second target power computed by the engine power fluctuation limitation unit 23, namely, a target rotary speed on the basis of a predetermined engine power characteristic table 25b that defines the rotary speed of the engine 11 relative to the engine power, namely, engine power characteristics. Further, the computed target rotary speed is used as a target speed command value, and the target speed command value is output to the inverter 14a to perform the speed control for the motor generator 13 through the inverter 14a. Accordingly, the assist power computing unit 25 limits the power of the motor generator 13 on the basis of the second target power computed by the engine power fluctuation limitation unit 22.

<Operation>

Figure 9:
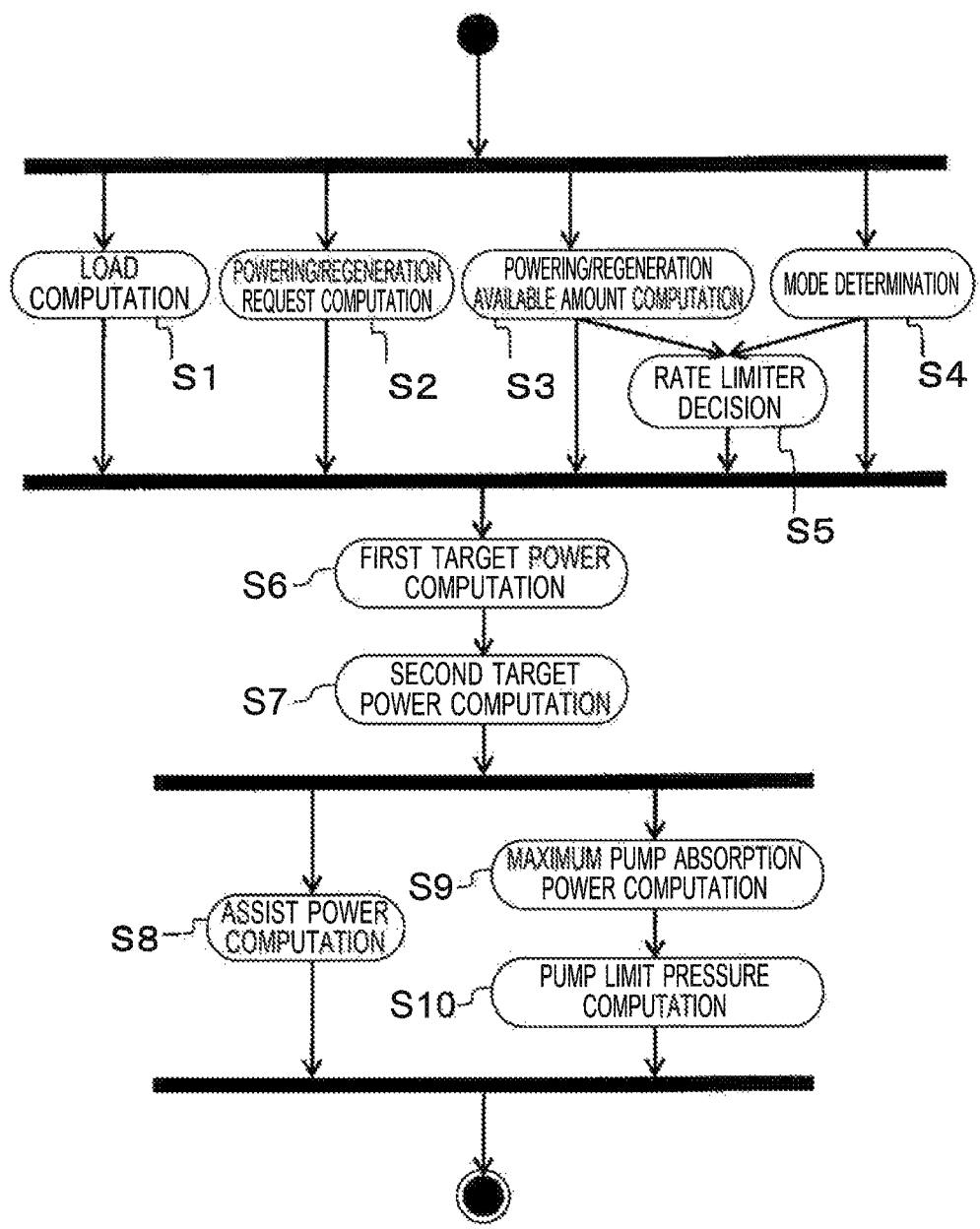
FIG. 9 is an activity diagram for showing a computation procedure in the above-described controller.

Next, a computing procedure of the leveling control in the controller 15 of the hydraulic excavator 1 according to the above-described first embodiment will be described with reference to FIG. 9. FIG. 9 is an activity diagram for showing a computing procedure in the controller 15.

When the on/off switch 19 is turned on to start the leveling control in the controller 15, computation in the load computing unit 21 and the vehicle body state management unit 22 is started, and various vehicle body states are determined. In the determination of the vehicle body states, load computation in the load computing unit 21 (S1); powering/regeneration request computation in the electric power management unit 22a of the vehicle body state management unit 22 (S2); powering/regeneration available amount computation in the electrical storage device management unit 22b (S3); and mode determination in the mode determination unit 22c (S4) are simultaneously started, and rate limiter decision (S55) in which the change rate (the increase rate or the decrease rate) of the variable rate limiter 23a is decided is started in accordance with the computation result in S3 and the determination result in S4.

After S5, the load power in the engine power fluctuation limitation unit 23 is added to the powering request or the regeneration request on the basis of the computation results of S1 and S2 to start first target power computation (S6). After S6, the first target power computed in S6 is input to the variable rate limiter 23a to start second target power computation (S7).

After S7, assist power computation (S8) in the assist power computing unit 25 in which a preliminarily-set torque command value is computed is started on the basis of a difference between the second target power computed in S7 and the load power computed in S1. In parallel with the start of S8, the limitation of the pump absorption power in the hydraulic power limitation unit 24 is started. As the limitation of the pump absorption power, maximum pump absorption power computation (S9) in which the maximum value (maximum powering amount) of the powering available amount is added to the second target power is performed, and then pump limit value computation (S10) in which the absorption power of the hydraulic pump 12 is limited is started by the limit pressure computing unit 24a on the basis of the maximum pump absorption power that is the computation result in S11.

The above-described processes of S1 to S10 are performed in each computation cycle of the controller 15.

Figure 10:
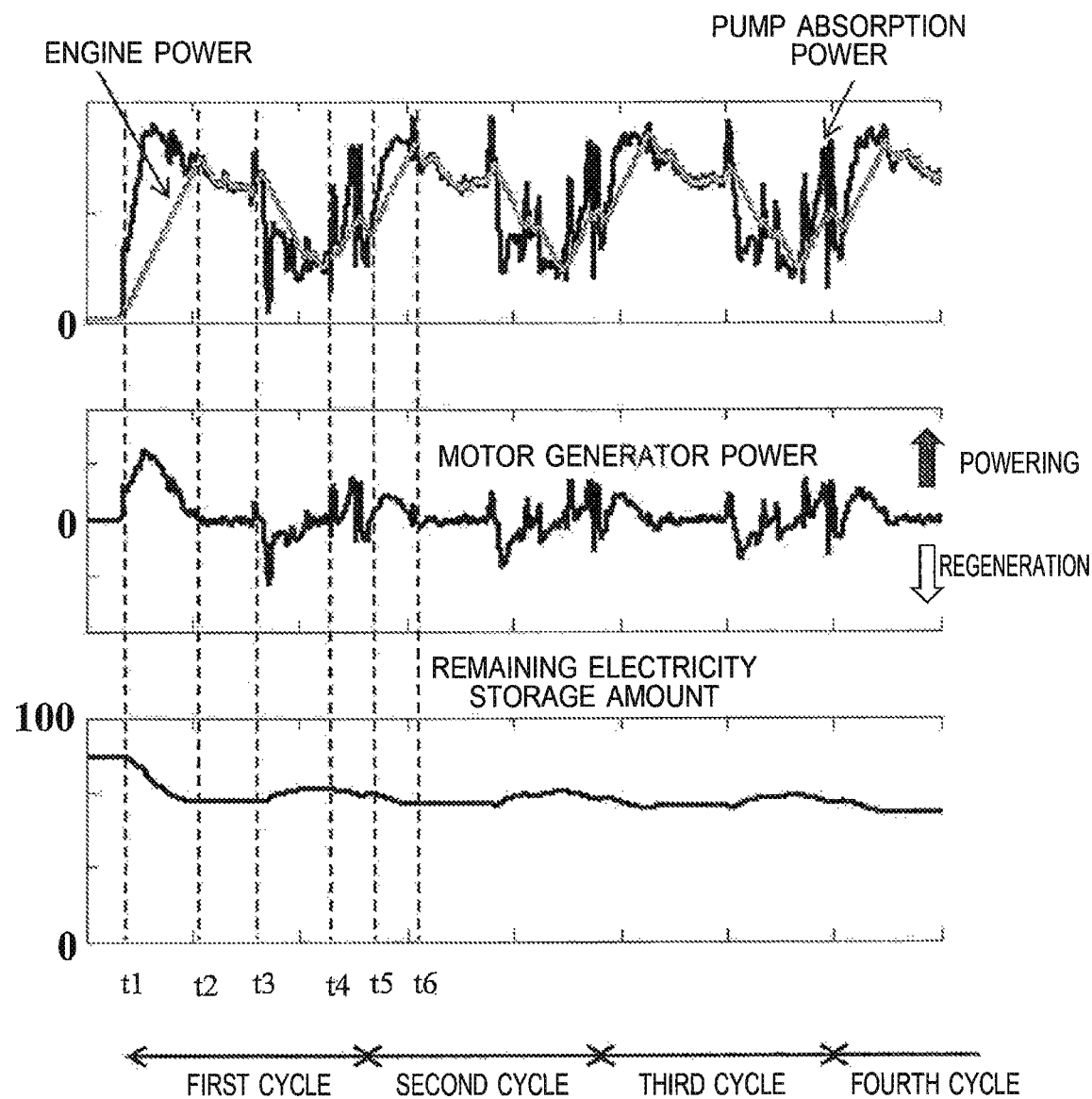
FIG. 10 are time charts in the case where a continuous excavation operation is performed using the above-described controller, (a) shows a relation between engine power and pump absorption power, (b) shows the power of the motor generator, and (c) shows the remaining electricity storage amount of the electrical storage device.

Next, as a concrete work example of the hydraulic excavator 1 according to the above-described first embodiment, a control operation for a continuous excavation operation will be described with reference to FIG. 10. FIG. 10 are time charts in the case where a continuous excavation operation is performed using the controller 15. FIG. 10(a) shows a relation between the engine power and the pump absorption power, FIG. 10(b) shows the power of the motor generator 13, and FIG. 10(c) shows the remaining electricity storage amount of the electrical storage device 14.

An excavation operation by the hydraulic excavator 1 is an operation in which gravel, earth and sand, and the like are scooped by the bucket 7, and the gravel, earth and sand, and the like scooped by the bucket 7 are dumped and loaded onto the load body of a dump truck (not shown). The excavation operation is characterized in that while a large hydraulic load is applied from the start of the excavation to the loading, the hydraulic load is rapidly reduced after the loading and dumping.

In FIG. 10(b), positive values represent the powering, and negative values represent the regeneration. Further, from the viewpoint of a simple explanation, the powering request or the regeneration request computed in the electric power management unit 22a is always assumed as zero (0), the powering available amount or the regeneration available amount computed in the electrical storage device management unit 22b is always assumed as the maximum value, and the mode switch 18 is assumed as not being operated during the operation.

The excavation operation is started at time t1, and a combined operation in which the arm 6 or the bucket 7 are crowded while lifting the boom 5 is started after time t1. Therefore, it is necessary to supply a large amount of hydraulic oil to each hydraulic actuator 17, and the pump absorption power steeply rises as shown in FIG. 10(a). In this case, the load power computed by the load computing unit 21 steeply rises in accordance with the absorption power (pump absorption power) of the hydraulic pump 12, and the first target power computed by the engine power fluctuation limitation unit 23 is also steeply changed.

On the contrary, the second target power that limits the increase rate of the first target power is generated by the variable rate limiter 23a of the engine power fluctuation limitation unit 23. Thus, the actual power of the engine 11 is slowly increased as compared to the rising of the pump absorption power. In this case, a deficiency of the requested pump absorption power is supplemented by the engine assist of the motor generator 13 by driving the motor generator 13 using the electric power from the electrical storage device 14.

When the deficient electric power to supplement the deficiency of the pump absorption power is larger than the powering available amount computed by the electrical storage device management unit 22b, the deficiency of the pump absorption power cannot be supplemented. In this case, the requested pump absorption power is abandoned, and the pump absorption power is limited by the hydraulic power limitation unit 24. Accordingly, the engine rotational speed is not decreased. The operation after time t1 continues to time t2 when the engine power matches the pump absorption power. However, the increase rate limited by the variable rate limiter 23a is changed in accordance with the state of the electrical storage device 14. Thus, when the powering available amount computed by the electrical storage device management unit 22b is small, the engine power matches the pump absorption power earlier than time t2. On the other hand, when the powering available amount computed by the electrical storage device management unit 22b is large, the engine power matches the pump absorption power later than time t2.

It should be noted that unlike the conventional technique to be described later, the increase rate of the engine power is not suppressed to the upper limit or lower, but the change rate (the increase rate and the decrease rate) of the engine power is allowed to follow the second target power, namely, the target value in the first embodiment. Accordingly, the actual increase rate of the engine power becomes larger than the desired increase rate of the engine power in some situations depending on the response to the control by the motor generator 13. In order to avoid the situation, the variable rate limiter 23a is designed to have room for the increase rate. Specifically, when the increase rate of the engine power is to be set at, for example, 30 kW/s or smaller, the increase rate of the variable rate limiter 23a is set at, for example, 25 kW/s. Thus, a possibility that the actual change rate of the engine power exceeds 30 kW/s is reduced.

In order to load the gravel, the earth and sand, and the like scooped by the bucket 7 on the load body of the dump truck, a so-called "revolving boom lifting" operation in which the revolving upperstructure 3 is revolved while lifting the boom 5 so that the bucket 7 is positioned at the load body of the dump truck is performed between time t2 and time t3. The "revolving boom lifting" operation requires the considerably-large pump absorption power. However, the pump absorption power is changed very slowly, and thus the pump absorption power is covered using only the engine power between time t2 and time t3. Therefore, the motor generator power becomes zero (0). When the powering request or the regeneration request is output from the electric power management unit 22a, the powering control by the motor generator 13 or the regeneration control by the hydraulic pump 12 is performed in an allowable range by the variable rate limiter 23a.

Between time t3 and time t4, a so-called "dumping" operation in which the gravel, the earth and sand, and the like scooped by the bucket 7 are loaded on the load body of the dump truck is performed. The "dumping" operation requires no large power except the operation of the bucket 7, and thus the pump absorption power is steeply decreased as compared to the case of the "revolving boom lifting" operation. Therefore, the load power computed by the load computing unit 21 is steeply decreased in accordance with the decrease of the pump absorption power, and the first target power calculated by the engine power fluctuation limitation unit 23 is also steeply changed. However, the second target power that limits the decrease rate of the first target power is generated by the variable rate limiter 23a. Then, a command value that controls the motor generator 13 so that the engine power matches the second target power is calculated by the assist power computing unit 25. Thus, the engine power is gradually decreased between time t3 and time t4, and the remaining electricity storage amount of the electrical storage device 14 is increased by the power generation operation of the motor generator 13 as shown in FIG. 10(c).

In order to return a tip end of the bucket 7 emptied after the dumping to a desired excavation position, a so-called "return" operation in which the boom 5, the arm 6, the bucket 7, and the revolving upperstructure 3 are compositely operated is performed between time t4 and time t5. In the "return" operation, plural hydraulic actuators 17 are operated, and thus the pump absorption power steeply rises. Specifically, the control operation between time t4 and time t5 is the same as that between time t1 and time t2. However, the engine power is gradually decreased, and is not steeply decreased between time t3 and time t4 before time t4. Thus, the control can be started in a state where the engine power is high, and only a small assist amount of the engine 11 by the motor generator 13 is necessary.

At time t5, a first cycle of the excavation operation is completed, and the large pump absorption power same as that at time t1 is necessary again. Between time t5 and time t6 in a second cycle, the control operation same as that between time t1 and time t2 in the first cycle is necessary. However, the engine power is not steeply decreased at time t5 as between time t3 and time t4 in the first cycle, and the control can be started in a state where the engine power is high. Thus, only a small assist amount of the engine by the motor generator 13 is necessary.

As described above, when the controller 15 according to the above-described first embodiment is used, the remaining electricity storage amount of the electrical storage device 14 remains around a certain value after the excavation operation of the second cycle as shown in FIG. 10(c). As a result, the engine 11 is assisted by the motor generator 13 in each cycle after the second cycle, and the continuous excavation operation can be continued without applying a steep load to the engine 11.

(Conventional Technique)

Figure 12:
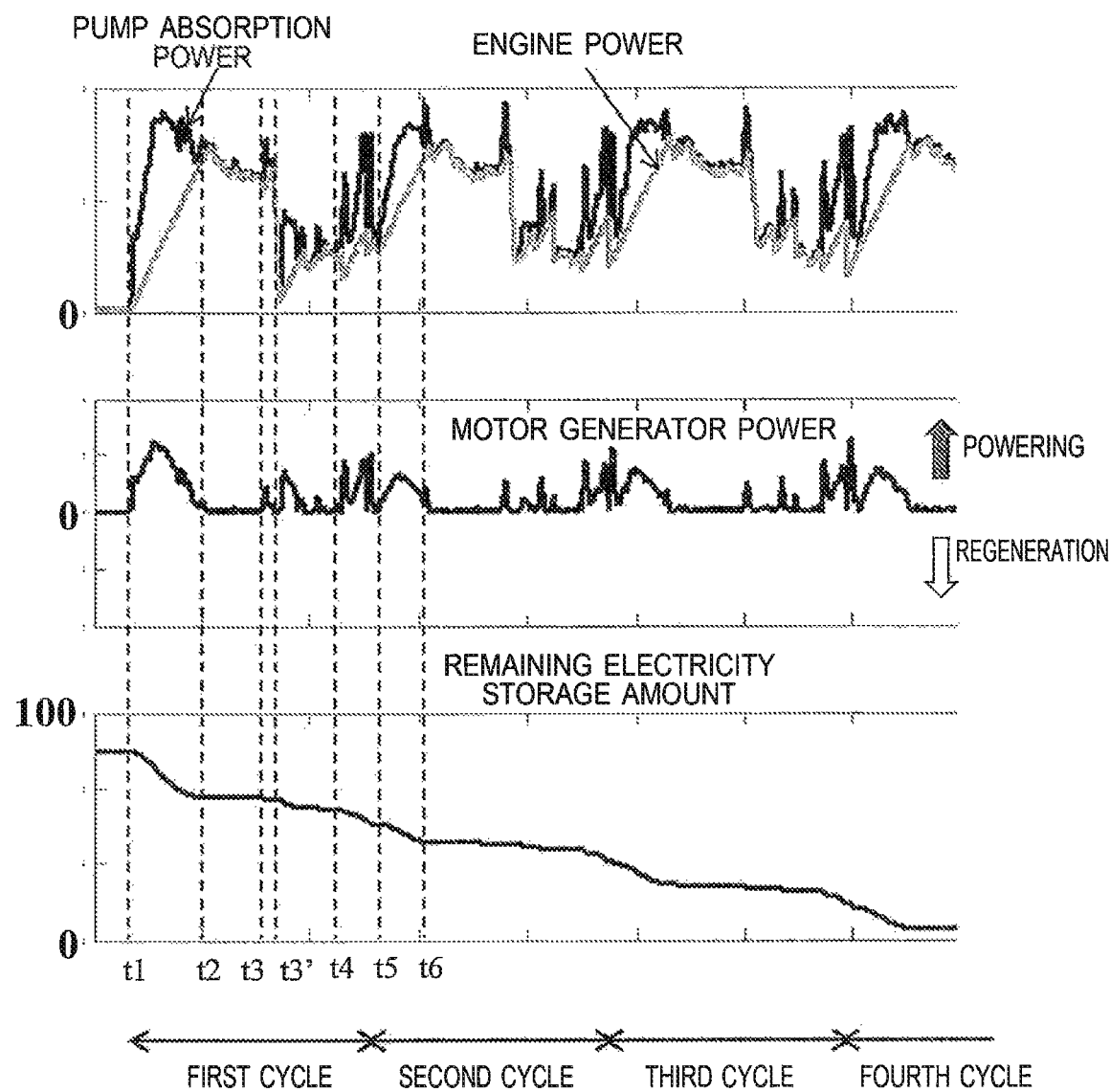
FIG. 12 are time charts in the case where a continuous excavation operation is performed by construction machinery described in the above-described Patent Literature 1, (a) shows a relation between engine power and pump absorption power, (b) shows the power of the motor generator, and (c) shows the remaining electricity storage amount of the electrical storage device.

Next, a control operation in the case where the continuous excavation operation is performed using hybrid construction machinery to which the conventional technique disclosed in the above-described Patent Literature 1 is applied will be described with reference to FIG. 12. FIG. 12 are time charts in the case where the continuous excavation operation is performed using the construction machinery described in the above-described Patent Literature 1. FIG. 12(a) shows a relation between the engine power and the pump absorption power, FIG. 12(b) shows the power of the motor generator, and FIG. 12(c) shows the remaining electricity storage amount of the electrical storage device. FIG. 12 correspond to FIG. 10, and time t1 to time t6 in FIG. 12 correspond to time t1 to time t6 in the control operation in the case where the continuous excavation operation is performed in the above-described first embodiment.

Between time t1 and time t2, the engine power is increased relative to the steeply-changed pump absorption power in accordance with a predetermined increase rate as similar to the above-described first embodiment. In the construction machine according to the above-described Patent Literature 1, even when a difference between the pump absorption power and the upper limit of an output of the engine is larger than the output limit value of the motor generator 13, the pump absorption power is not limited. Thus, the engine rotational speed is likely to be dropped. Further, in the construction machine according to the above-described Patent Literature 1, the setting state of the mode switch 18 and the vehicle body state such as the remaining electricity storage amount of the electrical storage device 14 are not monitored. Thus, the engine power is always increased at a constant increase rate, and the engine rotational speed is likely to be dropped in accordance with the deficiency of power.

Between time t2 and time t3, the pump absorption power is changed very slowly, and the pump absorption power is covered using only the engine power. As shown in FIG. 10(b), the motor generator power becomes zero (0). It should be noted that when the controller 15 according to the above-described first embodiment is used, the powering request or the regeneration request is always output from the electric power management unit 22a between time t2 and time t3, and the powering or the regeneration by the motor generator 13 is performed by the variable rate limiter 23a in an allowable range. Accordingly, the waveforms of the engine power and the pump absorption power are actually different from each other between the above-described first embodiment and the above-described Patent Literature 1.

The pump absorption power is steeply decreased between time t3 and time t4. However, only the maximum value of the engine power is defined in the construction machinery according to the above-described Patent Literature 1. Thus, the engine power is steeply decreased only between time t3 and time t3' in accordance with the engine power, and the pump absorption power is increased between time t3' and time t4. Accordingly, the engine power is increased in accordance with a predetermined increase rate as similar to between time t1 and time t2, and it is necessary to assist the engine plural times using the motor generator 13 to supplement the deficiency of the pump absorption power. Thus, the remaining electricity storage amount of the electrical storage device 14 is gradually decreased as shown in FIG. 10(*c*).

The pump absorption power is steeply increased again between time t4 and time t6, and thus the control operation same as that between time t1 and time t2 is performed.

Accordingly, in the construction machinery according to the above-described Patent Literature 1, the powering request or the regeneration request from the electric power management unit 22*a* is not considered when generating the second target power of the engine 11 as in the above-described first embodiment, and the electricity is not generated by the motor generator 13. Thus, the remaining electricity storage amount of the electrical storage device 14 is decreased as the cycles proceed from the first cycle to the fourth cycle. In particular, the remaining electricity storage amount of the electrical storage device 14 becomes nearly zero (0) in the fourth cycle, and the engine 11 cannot be assisted by the motor generator 13 at the time of the excavation operation in a fifth cycle.

<Operational Effect>

As described above, according to the hydraulic driving device 10 of the above-described first embodiment, when the second target power is generated by the engine power fluctuation limitation unit 23, the increase rate and the decrease rate of the engine power are limited by the variable rate limiter 23*a*. Accordingly, a steep fluctuation in the engine power can be suppressed, and the engine 11 can be operated in a condition based on a steady operation. Specifically, the operation of the engine 11 in a condition based on a steady operation is stable in a fuel combustion state as compared to a transient operation. Thus, the fuel consumption rate can be improved, and the amount of generation of exhaust gas applying a load to environments can be suppressed. Further, the operating point of the engine 11 is stabilized by the operation of the engine 11 based on a steady state, and thus noise caused by vibrations due to a fluctuation in the operation of the engine 11 can be suppressed from being generated.

Further, the power of the motor generator 13 is limited by the assist power computing unit 25 to allow the actual engine power of the engine 11 to follow the second target power, and the pump absorption power of the hydraulic pump 12 is limited by the hydraulic power limitation unit 24. Thus, the engine power can be prevented from being steeply increased, and the load of the engine can be prevented from becoming an excessive state. Accordingly, lug down (overload deceleration) in which the engine rotational speed is steeply dropped can be prevented, and the generation of the stall of the engine 11 can be appropriately avoided.

In particular, the hydraulic driving device 10 according to the above-described first embodiment is configured in such a manner that the upper limit of the engine power is not limited as in the construction machinery according to the above-described Patent Literature 1, but the target power for the engine power is given. Therefore, when the hydraulic load applied to the hydraulic pump 12 is steeply reduced and when the second target power with the decrease rate limited exceeds the pump absorption power, the power obtained by subtracting the second target power from the pump absorption power is generated by the motor generator 13, and the generated electric power can be supplied and stored to the electrical storage device 14.

Therefore, it is not necessary to steeply reduce the engine power in accordance with a steep reduction in the pump absorption power, and the engine power can be kept in a high operational state. Thus, when the pump absorption power is additionally increased, the engine power can be increased from a state in which the turbo pressure of a turbocharger attached to the engine 11 is not reduced, namely, from a high state, and a response delay of the turbocharger, namely, generation of the turbo lag can be eliminated. In particular, it is not necessary to steeply reduce the engine power, and the engine power can be kept in a high operational state. Thus, the engine 11 can be minimized because the engine 11 with a small maximum output can be used.

Further, the variable rate limiter 23*a* that generates the second target power from the first target power can sequentially change each of the increase rate and the decrease rate of the second target power, and thus the second target power associated with the state of the electrical storage device 14 can be generated. In particular, as the absolute value of the powering available amount computed by the electrical storage device management unit 22*b* is larger, the increase rate of the second target power is reduced. Accordingly, the engine power can be kept in a lower output state, and the fuel consumption amount of the engine 11 can be reduced more.

On the other hand, as the absolute value of the regeneration available amount computed by the electrical storage device management unit 22*b* is larger, the decrease rate of the second target power is reduced. Accordingly, the engine power can be kept in a higher output state. In addition, the motor generator 13 is driven using excessive power to generate electricity, and the generated electric power is supplied to the electrical storage device 14. Accordingly, the remaining electricity storage amount can be increased. Thus, the assist incapability for the engine by the motor generator 13 caused by the deficiency of the remaining electricity storage amount of the electrical storage device 14 can be prevented from being generated, and the engine 11 can be operated in an appropriate range for a long time.

Further, the engine power fluctuation limitation unit 23 calculates the first target power by adding the powering request or the regeneration request calculated by the electric power management unit 22*a* to the load power computed by the load computing unit 21. Therefore, the first target power is calculated as a value in consideration of electricity storage (regeneration request) to the electrical storage device 14 in addition to the hydraulic load of the hydraulic pump 12. Thus, the remaining electricity storage amount of the electrical storage device 14 can be controlled to fall within an appropriate range, and thus the assist incapability for the engine 11 by the motor generator 13 caused by the deficiency of the remaining electricity storage amount of the electrical storage device 14 can be prevented from being generated.

Further, when the powering request is calculated by the electric power management unit 22*a*, the assist for the engine 11 by the motor generator 13 is contained in the second target power generated by the engine power fluctuation limitation unit 23. Specifically, when the remaining electricity storage amount of the electrical storage device 14 is sufficient, the second target power in consideration of the assist for the engine 11 by the motor generator 13 is computed, and the second target power with the assist by the motor generator 13 subtracted is computed. Accordingly, the engine power can be kept in a low state, the fuel consumption amount caused by driving the engine 11 can be reduced more.

The electric power management unit 22*a* computes the powering request or the regeneration request of the motor generator 13 at each time so that the remaining electricity storage amount computed by the remaining electricity storage amount computing unit 22d matches the target remaining electricity storage amount, and thus the powering operation or the regeneration operation in accordance with each time can be realized. Thus, the remaining electricity storage amount of the electrical storage device 14 can be prevented from being steeply decreased, and the assist incapability for the engine 11 by the motor generator 13 associated with the deficiency of the remaining electricity storage amount of the electrical storage device 14 can be prevented from being generated.

Further, in addition to the remaining electricity storage amount of the electrical storage device 14, the powering available amount or the regeneration available amount is computed by the electrical storage device management unit 22b so that the electrical storage device 14 falls within an allowable range in which the electrical storage device 14 can be used in an appropriate state. Thus, the use of the motor generator 13 can be limited while considering a parameter (element) that has an adverse effect on the lifetime of the electrical storage device 14 such as, for example, the temperature of the electrical storage device 14 and a current integrated value, and the lifetime of the electrical storage device 14 can be prolonged.

It should be noted that when the load power is computed larger or smaller than the actual load power by the load computing unit 21, the second target power is set higher or lower by the engine power fluctuation limitation unit 23. However, the power is adjusted by the motor generator 13 so as to follow the second target power that is the target power of the engine 11, and thus necessary pump absorption power can be secured. Accordingly, the operability of the hydraulic excavator 1 can be prevented from being deteriorated.

Further, a computation error possibly occurs in the load power computed by the load computing unit 21 as a result of continuing the leveling control performed by the load computing unit 21, the vehicle body state management unit 22, the engine power fluctuation limitation unit 23, the hydraulic power limitation unit 24, and the assist power computing unit 25. The computation error possibly affects the power of the motor generator 13 and the remaining electricity storage amount of the electrical storage device 14. However, the remaining electricity storage amount of the electrical storage device 14 can be secured by feedback to the engine power fluctuation limitation unit 23 using the powering request or the regeneration request computed by the electric power management unit 22a, and thus the remaining electricity storage amount of the electrical storage device 14 can be kept in an appropriate range.

Further, for example, even when the load power is suddenly computed larger or smaller than the actual load power by the load computing unit 21 due to detection noise of the sensor such as the rotational speed sensor 11a, the second target power generated by the variable rate limiter 23a is not changed by limiting the increase/decrease rate and the decrease rate by the variable rate limiter 23a of the engine power fluctuation limitation unit 23. Thus, for example, the offset of the sensor such as the rotational speed sensor 11a and the robustness against noise generation can be provided.

Second Embodiment

Figure 11:
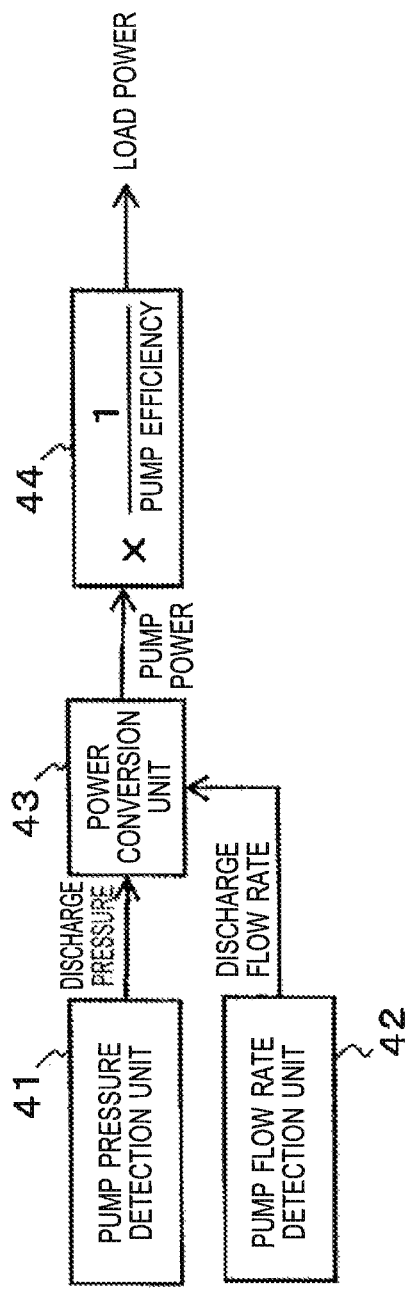
FIG. 11 is a schematic view for showing a process in a load computing unit of a controller of a hydraulic excavator according to a second embodiment of the present invention.

FIG. 11 is a schematic view for showing a process in the load computing unit 21A of the controller 15 of the hydraulic excavator 1 according to a second embodiment of the present invention. The second embodiment is different from the above-described first embodiment in that the load computing unit 21 that computes the load power from the engine power and the motor generator power is used in the first embodiment, whereas a load computing unit 21A that computes the load power from an output of the hydraulic pump 12 is used in the second embodiment. It should be noted that in the second embodiment, the same signs are given to the parts same as or corresponding to those in the first embodiment.

<Configuration>

A load computing unit 21A includes a pump pressure detection unit 41 that detects the discharge pressure of a hydraulic pump 12, and a pump flow rate detection unit 42 that detects the discharge flow rate of the hydraulic pump 12. The pump pressure detection unit 41 detects the discharge pressure through a discharge pressure sensor 12d. The pump flow rate detection unit 42 detects the discharge flow rate through a flow rate sensor 12e. The pump flow rate detection unit 42 may indirectly detect the discharge flow rate on the basis of the manipulated variable of an operating lever (not shown) that operates a hydraulic actuator 17, a control command value such as a pump command pressure supplied to an electromagnetic proportional valve 12c, and the tilting angle of a swash plate 12a of the hydraulic pump 12.

The discharge pressure detected by the pump pressure detection unit 41 and the discharge flow rate detected by the pump flow rate detection unit 42 are output to a power conversion unit 43. The power conversion unit 43 computes the pump power of the hydraulic pump 12 using the product of the discharge pressure and the discharge flow rate on the basis of the discharge pressure and the discharge flow rate of the hydraulic pump 12. The pump power computed by the power conversion unit 43 is output to a pump absorption power computing unit 44. The pump absorption power computing unit 44 computes the absorption power of the hydraulic pump 12 on the basis of the product of the pump power of the hydraulic pump 12 and the reciprocal of the pump efficiency (1/pump efficiency), namely, the division of the pump efficiency, and the pump absorption power is estimated as load power.

<Operational Effect>

According to the load computing unit 21A of the above-described second embodiment, the pump power of the hydraulic pump 12 is computed on the basis of the discharge pressure and the discharge flow rate of the hydraulic pump 12, the pump absorption power is computed using the pump power, and the pump absorption power is estimated as load power. Accordingly, the load power on the driving shaft 11c of the engine 11 can be computed as similar to the load computing unit 21 according to the above-described first embodiment.

Third Embodiment

A third embodiment is different from the above-described first embodiment in that the increase rate and the decrease rate of the second target power can be changed by the variable rate limiter 23a in the first embodiment, whereas the upper limit (increase) of the increase amount and the lower limit (decrease) of the decrease amount of the second target power can be changed by a variable rate limiter 23a in the third embodiment. It should be noted that the other configurations in the third embodiment are the same as those in the first embodiment.

Specifically, targets to be changed by the variable rate limiter 23a are not the increase rate of the second target power, but the upper limit of the increase amount and the lower limit of the decrease amount in the third embodiment. When the second target power is generated by an engine power fluctuation limitation unit 23, the upper limit of the increase amount and the lower limit of the decrease amount of the engine power are limited by the variable rate limiter 23a. Accordingly, the steep fluctuation in the engine power can be suppressed, and the engine 11 can be operated in a condition based on a steady operation as similar to the above-described first embodiment.

[Others]

It should be noted that the present invention is not limited to the above-described embodiments, but includes various modified modes. For example, the embodiments have been described to easily explain the present invention, and the present invention is not necessarily limited to those having the all configurations that have been described.

In each of the above-described embodiments, the hybrid-type hydraulic excavator 1 having the front working device 8 and the revolving device 4 has been described. However, the present invention is not limited to this, but can be used for a work machine having the hydraulic actuator 17 of, for example, a wheel loader, a wheel excavator, or a dump truck.

The electric power management unit according to each of the above-described embodiments may be configured in such a manner that the powering request or the regeneration request for the motor generator 13 mechanically connected to the engine 11 is calculated in accordance with the powering operation or the regeneration operation of the motor generator 13 that is not connected to the engine 11 as long as a work machine having the motor generator 13 other than that mechanically connected to the engine 11 is used.

In order to convert from the first target power to the second target power, a configuration using the variable rate limiter 23a has been described. However, for example, the second target power may be generated using a low-pass filter that can change a time constant or a moving average filter that can change the number of samples.

The load power is computed by the load computing unit 21 on the basis of the engine power and the motor generator power in the above-described first embodiment, and the load power is computed by the load computing unit 21A on the basis of the pump power in the above-described second embodiment. However, the present invention may be configured in such a manner that the load power having a larger value of the load computing units 21 and 21A is selected, the second target power is computed by the engine power fluctuation limitation unit 23 on the basis of the selected load power to always estimate the load power to be larger, and the stall of the engine 11 and the deterioration of an operational feeling caused by the deficiency of the power are prevented.

REFERENCE SIGNS LIST 1 hydraulic excavator (work machine)
2 lower travel base
2a travel device
3 revolving upperstructure
3a cab
4 revolving device
5 boom
5a boom cylinder
6 arm
6a arm cylinder
7 bucket
7a bucket cylinder
8 front working device
10 hydraulic driving device
11 engine
11a rotational speed sensor
11b governor
11c driving shaft
12 hydraulic pump
12a swash plate
12b regulator
12c electromagnetic proportional valve
12d discharge pressure sensor
12e flow rate sensor
12f tilting angle sensor
13 motor generator
13a rotation angle sensor
14 electrical storage device
14a inverter
14b current sensor (measurement unit)
14c voltage sensor (measurement unit)
14d temperature sensor (measurement unit)
15 controller
16 valve device
17 hydraulic actuator (hydraulic operation unit)
18 mode switch
18a swash plate
18b second regulator
18c second electromagnetic proportional valve
18d pressure sensor
18e flowmeter (flow rate detection unit)
18f tilting angle sensor
19 on/off switch
21, 21A load computing unit
21a engine rotational speed detection unit
21b engine torque detection unit
21c motor generator rotational speed detection unit
21d motor generator torque detection unit
21e engine power conversion unit
21f motor generator power conversion unit
21g addition computing unit
22 vehicle body state management unit
22a electric power management unit
22b electrical storage device management unit
22c mode determination unit
22d remaining electricity storage amount computing unit
23 engine power fluctuation limitation unit (engine target power computing unit)
23a variable rate limiter
24 hydraulic power limitation unit
24a limit pressure computing unit
25 assist power computing unit (assist power limitation unit)
25a limiter
25b engine power characteristic table
41 pump pressure detection unit
42 pump flow rate detection unit
43 power conversion unit
44 pump absorption power computing unit

The invention claimed is:

1. A work machine comprising:
an engine (11);
a hydraulic pump (12) that is driven by the engine (11);
a hydraulic operation unit (17) that is driven by pressure oil discharged from the hydraulic pump (12);
a motor generator (13) that drives the hydraulic pump (12);
an electrical storage device (14) that transfers electric power with the motor generator (13);
a load computing unit (21, 21A) that computes load power of the engine (11);

a vehicle body state management unit (22) that manages a vehicle body state including the state of the electrical storage device (14);

an engine target power computing unit (23) that computes engine target power for limiting an increase and a decrease in the power of the engine (11) on the basis of the load power computed by the load computing unit (21, 21A) and the vehicle body state managed by the vehicle body state management unit (22);

a hydraulic power limitation unit (24) that limits the power of the hydraulic pump (12) on the basis of the engine target power computed by the engine target power computing unit (23); and an assist power limitation unit (25) that limits the power of the motor generator (13) on the basis of the engine target power computed by the engine target power computing unit (23).

2. The work machine according to claim 1, wherein the vehicle body state management unit (22) has an electrical storage device management unit (22b) that computes a powering available amount for powering the hydraulic pump (12) in the electrical storage device (14) through the motor generator (13), and as an absolute value of a powering available amount computed by the electrical storage device management unit (22b) is larger, the engine target power computing unit (23) corrects an increase in the engine target power to be smaller.

3. The work machine according to claim 2, wherein the vehicle body state management unit (22) has an electrical storage device management unit (22b) that computes a regeneration available amount regenerated from the hydraulic pump (12) to the electrical storage device (14) through the motor generator (13), and as the absolute value of the regeneration available amount computed by the electrical storage device management unit (22b) is larger, the engine target power computing unit (23) corrects a decrease of the engine target power to be smaller.

4. The work machine according to claim 2, wherein the vehicle body state management unit (22) has an electric power management unit (22a) that computes powering power or regeneration power for the motor generator (13), and the engine target power computing unit (23) computes the engine target power on the basis of the load power computed by the load computing unit (21, 21A) and the powering power or the regeneration power computed by the electric power management unit (22a).

5. The work machine according to claim 4, wherein measurement units (14b to 14d) that measure the state of the electrical storage device (14), the vehicle body state management unit (22) has a remaining electricity storage amount computing unit (22d) that computes the remaining electricity storage amount of the electrical storage device (14) at each predetermined time on the basis of the state of the electrical storage device (14) measured by the measurement units (14b to 14d), and an electrical storage device management unit (22b) that computes a powering available amount for powering the hydraulic pump (12) in the electrical storage device (14) through the motor generator (13) and a regeneration available amount regenerated from the hydraulic pump (12) to the electrical storage device (14) through the motor generator (13), the electric power management unit (22a) computes the powering power or the regeneration power so that the remaining electricity storage amount computed at each time by the remaining electricity storage amount computing unit (22d) matches a predetermined target remaining electricity storage amount, and the electrical storage device management unit (22b) calculates the remaining electricity storage amount computed at each time by the remaining electricity storage amount computing unit (22d) and the powering available amount or the regeneration available amount that can be used by the electrical storage device (14) in a predetermined range.

6. The work machine according to claim 1, wherein the vehicle body state management unit (22) has an electrical storage device management unit (22b) that computes a regeneration available amount regenerated from the hydraulic pump (12) to the electrical storage device (14) through the motor generator (13), and as an absolute value of a regeneration available amount computed by the electrical storage device management unit (22b) is larger, the engine target power computing unit (23) corrects a decrease in the engine target power to be smaller.

7. The work machine according to claim 6, wherein the vehicle body state management unit (22) has an electric power management unit (22a) that computes powering power or regeneration power for the motor generator (13), and the engine target power computing unit (23) computes the engine target power on the basis of the load power computed by the load computing unit (21, 21A) and the powering power or the regeneration power computed by the electric power management unit (22a).

8. The work machine according to claim 7, wherein measurement units (14b to 14d) that measure the state of the electrical storage device (14), the vehicle body state management unit (22) has a remaining electricity storage amount computing unit (22d) that computes the remaining electricity storage amount of the electrical storage device (14) at each predetermined time on the basis of the state of the electrical storage device (14) measured by the measurement units (14b to 14d), and an electrical storage device management unit (22b) that computes a powering available amount for powering the hydraulic pump (12) in the electrical storage device (14) through the motor generator (13) and a regeneration available amount regenerated from the hydraulic pump (12) to the electrical storage device (14) through the motor generator (13), the electric power management unit (22a) computes the powering power or the regeneration power so that the remaining electricity storage amount computed at each time by the remaining electricity storage amount computing unit (22d) matches a predetermined target remaining electricity storage amount, and the electrical storage device management unit (22b) calculates the remaining electricity storage amount computed at each time by the remaining electricity storage amount computing unit (22d) and the powering available amount or the regeneration available amount that can be used by the electrical storage device (14) in a predetermined range.

9. The work machine according to claim 1, wherein the vehicle body state management unit (22) has an electric power management unit (22a) that computes powering power or regeneration power for the motor generator (13), and the engine target power computing unit (23) computes the engine target power on the basis of the load power computed by the load computing unit (21, 21A) and the powering power or the regeneration power computed by the electric power management unit (22a).

10. The work machine according to claim 9, wherein measurement units (14b to 14d) that measure the state of the electrical storage device (14), the vehicle body state management unit (22) has a remaining electricity storage amount computing unit (22d) that computes the remaining electricity storage amount of the electrical storage device (14) at each predetermined time on the basis of the state of the electrical storage device (14) measured by the measurement units (14b to 14d), and an electrical storage device management unit (22b) that computes a powering available amount for powering the hydraulic pump (12) in the electrical storage device (14) through the motor generator (13) and a regeneration available amount regenerated from the hydraulic pump (12) to the electrical storage device (14) through the motor generator (13), the electric power management unit (22a) computes the powering power or the regeneration power so that the remaining electricity storage amount computed at each time by the remaining electricity storage amount computing unit (22d) matches a predetermined target remaining electricity storage amount, and the electrical storage device management unit (22b) calculates the remaining electricity storage amount computed at each time by the remaining electricity storage amount computing unit (22d) and the powering available amount or the regeneration available amount that can be used by the electrical storage device (14) in a predetermined range.

* * * * *